(12) United States Patent
Xu et al.

(10) Patent No.: US 12,155,675 B2
(45) Date of Patent: Nov. 26, 2024

(54) VERIFICATION METHOD FOR FAST SOURCE AND PATH EMBEDDED WITH RANDOM AUTHENTICATION

(71) Applicant: Tsinghua University, Beijing (CN)

(72) Inventors: Ke Xu, Beijing (CN); Fan Yang, Beijing (CN); Bo Wu, Beijing (CN); Qi Li, Beijing (CN); Jianping Wu, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 336 days.

(21) Appl. No.: 17/551,441

(22) Filed: Dec. 15, 2021

(65) Prior Publication Data

US 2022/0109683 A1     Apr. 7, 2022

Related U.S. Application Data

(63) Continuation of application No. PCT/CN2021/088461, filed on Apr. 20, 2021.

(30) Foreign Application Priority Data

Apr. 24, 2020 (CN) .......................... 202010331816.8

(51) Int. Cl.
*H04L 9/40* (2022.01)
*H04L 45/00* (2022.01)

(52) U.S. Cl.
CPC ........ *H04L 63/1416* (2013.01); *H04L 45/566* (2013.01); *H04L 63/1425* (2013.01); *H04L 63/1466* (2013.01); *H04L 63/20* (2013.01)

(58) Field of Classification Search
CPC ............. H04L 63/1416; H04L 63/1425; H04L 63/1466; H04L 63/20; H04L 63/0435;

(Continued)

(56) References Cited

U.S. PATENT DOCUMENTS

| 6,795,917 | B1 * | 9/2004 | Ylonen | ............... | H04L 61/2578 726/13 |
| 7,810,133 | B2 * | 10/2010 | Carter | ................. | G06F 21/6218 726/2 |

(Continued)

FOREIGN PATENT DOCUMENTS

WO     WO-2012007693 A1 *  1/2012  ............. H04L 63/08

OTHER PUBLICATIONS

WIPO, International Search Report for PCT/CN2021/088461, Jul. 21, 2021.

*Primary Examiner* — Bassam A Noaman
(74) *Attorney, Agent, or Firm* — Hodgson Russ LLP

(57) ABSTRACT

A verification method for fast source and path embedded with random authentication is provided. The method includes: generating a corresponding verification structure for an expected path according to a predetermined path strategy, embedding different m pieces of fragment information randomly selected with same possibility from the verification structure for the expected path to a header of a data packet to be transmitted in a data flow, and transmitting the data packet to be transmitted with the embedded fragment information to a next hop of routing node of the expected path, performing a verification on the received data packet by the respective intermediate routing node on the expected path, and forwarding the data packet to the next routing node when the verification passes, performing verification on the received data packet by the data flow destination, performing a parsing verification evaluation on the expected path when the verification passes.

12 Claims, 3 Drawing Sheets

(58) Field of Classification Search
CPC ... H04L 63/105; H04L 63/12; H04L 63/1458; H04L 63/1475; H04L 63/08; H04L 45/566; H04L 2463/146; G06F 21/566; G06F 21/50; H04W 12/102
See application file for complete search history.

(56) References Cited

U.S. PATENT DOCUMENTS

| | | | |
|---|---|---|---|
| 2008/0031257 A1* | 2/2008 | He | H04L 45/54 370/395.31 |
| 2011/0135094 A1* | 6/2011 | Muto | H04W 12/0433 380/270 |
| 2016/0315921 A1* | 10/2016 | Dara | H04L 69/166 |
| 2018/0167393 A1* | 6/2018 | Walrant | H04L 63/101 |

* cited by examiner

VERIFICATION METHOD FOR FAST SOURCE AND PATH EMBEDDED WITH RANDOM AUTHENTICATION

CROSS-REFERENCE TO RELATED APPLICATION

The present application is a continuation of International Application No. PCT/CN2021/088461, filed on Apr. 20, 2021, which claims priority to Chinese Patent Application No. 202010331816.8, filed on Apr. 24, 2020, the entire disclosures of which are incorporated herein by reference.

FIELD

The present disclosure relates to the technical field of network security, in particular to a verification method for fast source and path embedded with random authentication.

BACKGROUND

At present, the scale of the Internet is rapidly expanding. Service provided by the network for users is becoming relative novel and diversified, and users' demand for network service security, credibility and guarantee capability is also increasing. With the continuous exposure of network security incidents, users gradually began to pay attention to potential network security threats. Some malicious attackers often take advantage of the lack of verification of forwarding behavior by intermediate routing nodes to initiate data flow redirection attacks, which cause user data packets to pass through areas other than the normal path (including malicious nodes controlled by the attacker), resulting in privacy-sensitive data information being eavesdropped and influence on the efficiency of network transmission. In addition, malicious attackers may imitate the source address information and embed malicious code and other harmful payloads in the data packets to inject the destination, or flood and initiate arbitrary data flows to perform distributed denial of service attacks on the destination. Source and path are the two key elements involved in the above-mentioned security issues. How to implement source and path verification in the existing network environment is of great significance to improve network transmission security.

There are many researches on data source verification at present, such as source suppression of network attacks, source filtering defense at the destination, and secure access control, etc. However, research work to solve the authenticity verification of source and path information at the same time is relatively lacking. The existing source and path information verification scheme is mainly based on the way of router mark embedding, that is, the scheme requires the router through which the data packet passes to calculate a special mark and embed it in the verification structure of the packet header. The subsequent routing nodes and the final destination completes the actual inspection based on the verification structure. In this manner, not only additional payloads of the data packet are more, leading to an increased network communication overhead, but also more complicated calculations are required for verification by each router, which intensifies the equipment processing overhead. In particular, when there are hidden attack nodes in the network, these potential nodes do not implement the technical requirements of the verification scheme, and do not add any marks about themselves after performing abnormal operations on the data packets. It will be difficult for subsequent normal nodes and the destination to detect such problems.

SUMMARY

The present disclosure aims at solving technical problems in the related art to at least some extent.

Embodiment of the present disclosure provide a verification method for fast source and path embedded with random authentication. The method includes: generating, by a data flow source, a corresponding verification structure for an expected path according to a predetermined path strategy, and transmitting notification information of a current data flow to respective routing nodes on the expected path, in which, the verification structure for the expected path includes N pieces of fragment information to be verified, and N is the number of hops of the expected path; embedding, by the data flow source, different m pieces of fragment information randomly selected with same possibility from the verification structure for the expected path to a header of a data packet to be transmitted in a data flow, and transmitting the data packet to be transmitted with the embedded fragment information to a next routing node of the expected path, in which $1 \leq m \leq N$; receiving a data packet by each intermediate routing node on the expected path, performing a parsing verification on the data packet in case that the fragment information corresponding to the routing node is embedded in the received data packet, and forwarding the data packet to a next routing node in case that the parsing verification passes; performing a simplified verification according to the notification information in case that no fragment information corresponding to the routing node is embedded in the received data packet, and forwarding the data packet to the next routing node in case that the simplified verification passes; verifying, by a data flow destination, the received data packet through the parsing verification or the simplified verification after receiving the data packet, determining that the received data packet completes a verification process on the expected path and is normal in case that the verification passes, and discarding the received data packet in case that the verification fails; and performing a parsing verification evaluation on the expected path, and setting different parsing verification rates for the expected path according to different security level requirements, so as to achieve different levels of source and path verification strength.

The additional aspects and advantages of the present disclosure will be partially given in the following description, and some will become obvious from the following description, or be understood through the practice of the present disclosure.

DESCRIPTION OF DRAWINGS

The above and/or additional aspects and advantages of the present disclosure will become obvious and easy to understand from the following description of the embodiments in conjunction with the accompanying drawings, in which.

DETAILED DESCRIPTION

Figure 1:
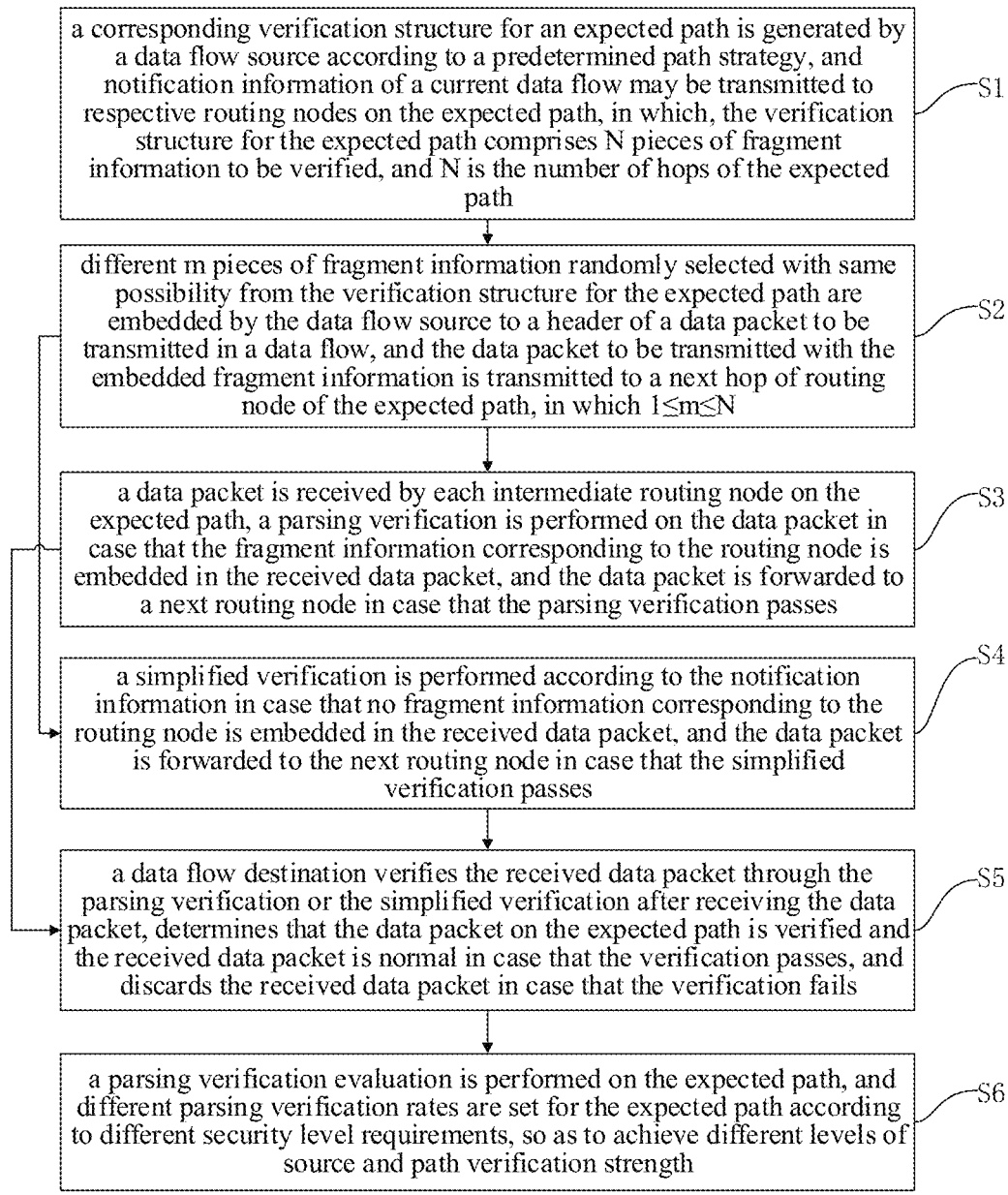
FIG. 1 is a flowchart of a verification method for fast source and path embedded with random authentication according to an embodiment of the present disclosure.

The embodiments of the present disclosure are described in detail below. Examples of the embodiments are shown in the accompanying drawings, in which the same or similar reference numerals indicate the same or similar elements or elements with the same or similar functions. The embodiments described below with reference to the accompanying drawings are exemplary, and are intended to explain the present disclosure, but should not be construed as limiting the present disclosure.

The verification method for fast source and path embedded with random authentication according to the embodiments of the present disclosure will be described with reference to the accompanying drawings.

According to the predetermined path strategy, the present disclosure designs a fragmented authentication structure for data flow source and path information, so that each routing node and destination can perform real-time forwarding state authenticity verification on received data packets according to the authentication structure and authentication information in real time.

In the embodiment of the present disclosure, first, it is assumed that the data flow source (or data flow destination) of the data flow can reach an agreement with the network operator in advance, and learn the predetermined path strategy in advance in a variety of ways, for example, through network topology analysis or obtaining BGP Protocol path announcements or using routing protocols of existing control planes. Second, it is assumed that a security method (such as the existing method Diffie-Hellman) is initially used to complete the symmetric key (Key_Ri.Session) exchange required for data flow transmission verification among the respective routing nodes $R_i$ involved data flow source and path strategy, that is, the data flow source has known the verification symmetric key of each routing node for the data flow during the transmission initialization stage. Third, the data flow source and the respective routing node $R_i$ can use an identity-based signature system (such as an existing system that uses an identity ID as a public key) to sign verification control messages generated by themselves (that is, control information required for the authenticity verification process other than the actual data payload of the data flow) according to the requirement on the security level, including data flow notification information, error reports, and so on. We will not discuss the possible loss of verification control messages and believe that verification control messages have a higher priority in transmission, and communication and verification control messages can be transmitted for several times or in multiple directions to ensure that they can be received with a very high probability. Fourth, suppose that in the network environment, each network node maintains the corresponding relationship between itself and neighbor nodes, and all nodes participating in a data flow transmission maintain loose time synchronization (such as using NTP time, etc.).

Through the above description, the specific method steps of the present disclosure will be described in detail below.

FIG. 1 is a flowchart of a verification method for fast source and path embedded with random authentication according to an embodiment of the present disclosure.

As shown in FIG. 1, the method includes the following steps.

At S1, a corresponding verification structure for an expected path is generated by a data flow source according to a predetermined path strategy, and notification information of a current data flow may be transmitted to respective routing nodes on the expected path, in which, the verification structure for the expected path comprises N pieces of fragment information to be verified, and N is the number of hops of the expected path.

Further, different nodes on the expected path receive different notification information. The notification information includes an expected previous hop information of each routing node and a valid time limit of the data flow. Each routing node needs to parse the notification information with a verification symmetric key for different data flows, and each routing node temporarily stores and maintains the received notification information according to the valid time limit of the data flow.

Specifically, the data flow source generates the corresponding expected path verification structure (hereinafter referred to as the EPVS structure) according to a predetermined path strategy, and pushes the notification information of the current data flow to the respective routing nodes on the expected path.

The data flow source may encrypt and generate an EPVS verification structure that can be used as a predetermined path policy certification using the known verification symmetric key of the respective routing node of the expected path during a certain transmission initialization stage. The EPVS verification structure includes multiple pieces of fragment information to be verified (hereinafter referred to as VS information), and the number of pieces of fragment information is equal to the number of hops of the expected path (that is, the number of hops of the expected path is one less than the number of nodes on the expected path), and a certain VS information is generated by encrypting an expected previous hop of information of a certain routing node $R_i$ with the aid of the verification symmetric key of the node of the data flow. Here, the i-th piece of $VS_i$ information is represented as $<R_{i-1}>$, especially the last piece of $VS_{Last}$ information is generated by encrypting the expected previous hop of information of the data flow destination $R_{Last}$ and the information of the data flow source by using the verification symmetric key of the data flow destination, which is represented as $<R_{Last-1}R_0>$.

In addition, the data flow source will transmit the notification information of the data flow to each routing node (including the data flow destination) on the expected path. This notification content mainly contains the expected previous hop of information of the respective network node on the initial expected path and a valid time limit of the data flow, etc., which may be used to remind the respective network nodes to prepare for the subsequent verification of the data flow. The notification information received by different nodes may be different, which can only be parsed by the node with the verification symmetric key of the data flow. Each routing node temporarily stores and maintains the received notification information according to the valid time limit of the data flow.

At S2, different m pieces of fragment information randomly selected with same possibility from the verification structure for the expected path are embedded by the data flow source to a header of a data packet to be transmitted in a data flow, and the data packet to be transmitted with the embedded fragment information is transmitted to a next routing node of the expected path, in which 1 N.

Specifically, the data flow source randomly embeds m (1≤m≤N) different VS fragments in the EPVS verification structure (having N VS fragments in total) with the same probability into the header of the data packet to be transmitted (i.e., between the IP header and the TCP header), and transmits the data packet carrying the VS fragment to the next hop of routing node.

Since the probabilities of the respective VS fragments being selected are equal, the probability that the source embeds a certain $VS_i$ fragment into a certain data packet is $P=C_{N-1}^{m-1}/C_N^m=m/N$. If the source has transmitted t data packets, then the probability $q_{t,i}$ that a certain $VS_i$ fragment has been already embedded into the data packet by the source can be calculated with the following formula (1). For all N VS fragments of the EPVS verification structure, when the source embeds all of fragments at least once in the X data packets that have been transmitted in the above manner, the probability that the number of the transmitted packets X is less than or equal to t (P(X≤t)) can be calculated according to the following formula (2).

$$q_{t,i} = 1 - (1-p)^t = 1 - \left(1 - \frac{m}{N}\right)^t, \quad (1)$$
$$1 \leq i \leq N$$

$$P(X \leq t) = \prod_{i=1}^{N} q_{t,i} = (q_{t,i})^N = \left(1 - \left(1 - \frac{m}{N}\right)^t\right)^N \quad (2)$$

At S3, a data packet is received by each intermediate routing node on the expected path, a parsing verification is performed on the data packet in case that the fragment information corresponding to the routing node is embedded in the received data packet, and the data packet is forwarded to a next routing node in case that the parsing verification passes.

Further, performing the parsing verification on the data packet in case that the fragment information corresponding to the routing node is embedded in the received data packet may include: performing, by an intermediate routing node on the expected path, the parsing verification on the corresponding fragment information with a verification symmetric key of the intermediate routing node, to obtain the expected previous hop of information of the current data packet, and determining whether an actual previous hop of information of a receiving port of the current data packet is consistent with the expected previous hop of information, determining that the verification passes and replacing the expected previous hop of information which is temporarily stored in the notification information by the expected previous hop of information which is obtained after parsing in case that the actual previous hop of information is consistent with the expected previous hop of information, and determining that the verification fails in case that the actual previous hop of information is inconsistent with the expected previous hop of information.

Further, each intermediate routing node on the expected path performs a verification on the received data packet, discards the received data packet in a case that the verification fails and transmits error report information and/or warning report information to the data flow source and the data flow destination respectively based on a security level.

Specifically, after each intermediate routing node receives the data packet of the data flow, if the current data packet header has embedded with the corresponding VS fragment, the verification on the actual forwarding state of the current data packet is completed by parsing the VS fragment (which is referred as performing a parsing verification in followings). For a routing node $R_i$, if the header of the received data packet carries the fragment information $VS_i$, the node $R_i$ uses its own verification symmetric key to parse the $VS_i$ fragment to obtain the expected previous hop of information (i.e., <$R_{i-1}$>), which is compared with the actual forwarding state of the current data packet, to determine whether the previous hop of information (indicated by $R_{i-1}$') of the actual receiving port of the data packet is consistent with $R_{i-1}$. If they are consistent, it means that the data packet has passed the previous hop node certified by predetermined path policy, the verification on the current forwarding state of the data packet passes, and the routing node will continue to forward the data packet. At the same time, the routing node $R_i$ updates and replaces the expected previous hop of information value temporarily stored in the data flow notification information with the expected previous hop information $R_{i-1}$ which is obtained after parsing.

If they are inconsistent, the routing node $R_i$ finds that the verification fails, the data packet may be discarded to prevent from security hazards caused by abnormal data packet continuing to reach the receiving end, and the node $R_i$ needs to issue error report information to the data flow source and destination according to the actual situation. When the level of security requirements is relative high (higher than the pre-set value), the respective routing nodes will also actively generate warning report information for the received data packet of the data flow with a random time interval within the valid time limit of the data flow (that is, the warning report information describes that the data packet of the data flow is received with a certain time interval and whether its verification state is normal and other key contents), and the warning report information may be delivered to the corresponding data flow source and destination respectively.

At S4, a simplified verification is performed according to the notification information in case that no fragment information corresponding to the routing node is embedded in the received data packet, and the data packet is forwarded to the next routing node in case that the simplified verification passes.

Further, performing the simplified verification according to the notification information in case that no fragment information corresponding to the routing node is embedded in the received data packet includes: comparing, by an intermediate routing node on the expected path, an expected previous hop of information in the notification information with an actual previous hop of information of a receiving port of the current data packet to determine whether they are consistent, and determining that the verification passes in case that the expected previous hop of information in the notification information is consistent with the actual previous hop of information of the receiving port of the current data packet, and determining that the verification fails in case that the expected previous hop of information in the notification information is inconsistent with the actual previous hop of information of the receiving port of the current data packet.

Specifically, if the header of the data packet received by the intermediate routing node is not embedded with the corresponding VS fragment, the verification (referred to as the simplified verification in followings) on the actual forwarding state of the current data packet is completed by comparing with the expected previous hop information value temporarily stored in the notification information of the data flow. Although the simplified verification process skips the time-consuming processing operation of using the verification symmetric key to decrypt the fragment information, it does not lose the verification function of the actual forwarding state of the data packet. Considering that a certain data flow is transmitted within a short time interval when the network node receives several data packets, it is very unlikely that the expected path information (that is, the predetermined path strategy) will change. For a routing node if the received data packet header does not carry $VS_{i+1}$ fragment information, then node $R_{i+1}$ uses the value of the latest expected previous hop of information $R_i$ stored in the notification information of the data flow to determine whether the previous hop of information of the actual receiving port of the data packet (represented by $R_{i'}$) is consistent with $R_i$. If they are consistent, the verification on the current forwarding state of the data packet passes, and the routing node will continue to forward the data packet. Otherwise, if the routing node $R_i$ finds that the verification fails, the data packet will be discarded and corresponding error report information or warning report information will be issued to the data flow source and destination according to the actual situation.

At S5, a data flow destination verifies the received data packet through the parsing verification or the simplified verification after receiving the data packet, determines that the received data packet completes a verification process on the expected path and is normal in case that the verification passes, and discards the received data packet in case that the verification fails.

Further, verifying, by the data flow destination, the received data packet through the parsing verification or the simplified verification after receiving the data packet may include: comparing an expected previous hop of information of the current data packet with the actual previous hop of information of the receiving port of the current data packet, if they are consistent, comparing actual transmitting source address information in the header of the current data packet with expected start node information, and if the actual transmitting source address information is consistent with expected start node information, determining that the verification passes, and if the actual transmitting source address information is inconsistent with expected start node information, determining that the verification fails and discarding the data packet.

Specifically, after the data flow destination receives the data packet of the data flow, the previous hop of information of the actual receiving port of the current data packet $R_{Last-1'}$ is compared with the expected previous hop of information after parsing (or in the notification information) $R_{Last-1}$ according to whether the current data packet is embedded with the VS fragment corresponding to the current data packet by using the parsing verification method at S3 or simplified verification method at S4, to determine whether $R_{Last-1'}$ is consistent with $R_{Last-1}$, and it may also be determined whether the transmitting source address information of the current packet header is the consistent as the information on the expected starting node $R_0$ obtained by the parsing (or in the notification information). If all the above verifications are passed, it means that the verification of the data packet on the whole transmission path of the data flow has been completed, and the received data packet is in a normal state. Otherwise, if the receiving end finds that the verification fails, the data packet is discarded to prevent the abnormal data packet from causing greater security hazards.

At S6, a parsing verification evaluation is performed on the expected path, and different parsing verification rates are set for the expected path according to different security level requirements, so as to achieve different levels of source and path verification strength.

Performing the parsing verification evaluation on the expected path may include: performing, by intermediate routing nodes and the data flow destination, the parsing verification on all data packets received for at least once in case that X data packets of the data flow have embedded with the N pieces of fragment information of the expected path verification structure at least once, to achieve once parsing verification of the expected path; in which, for the total number of the transmitted data packets X, an expected value is represented as:

$$E(X) = \sum_{t=1}^{\infty} tP(X=t) = \sum_{t=1}^{\infty} P(X=t)\sum_{r=1}^{t} 1 = \qquad (3)$$

$$\sum_{r=1}^{\infty}\sum_{t=r}^{\infty} P(X=t) = \sum_{r=1}^{\infty} P(X \geq r) = \sum_{t=1}^{\infty} P(X \geq t),$$

based on $P(X \geq t)=1-P(X \leq t-1)$ and the formula (2), an expected value of the total number of the transmitted data packets X is represented as:

$$E(X) = \sum_{t=1}^{\infty}(1-P(X \leq t-1)) = \sum_{t=1}^{\infty}\left(1-\left(1-\left(1-\frac{m}{N}\right)^{t-1}\right)^N\right), \qquad (4)$$

a lower limit range of the expected value is represented as follows by deriving the formula (4):

$$E(X) = \sum_{t=1}^{\infty}\left(1-\left(1-\left(1-\frac{m}{N}\right)^{t-1}\right)^N\right) > \sum_{t=1}^{\infty}\left(1-\left(1-e^{-\frac{m}{N}(t-1)}\right)^N\right) \geq \qquad (5)$$

$$\sum_{t=1}^{\infty}\left(1-\left(1-Ne^{-\frac{m}{N}(t-1)}\right)\right) = \sum_{t=1}^{\infty} Ne^{-\frac{m}{N}(t-1)} \geq N\sum_{t=1}^{\infty} e^{-\frac{m}{N}(t-1)} =$$

$$N\left(\left(e^{-\frac{m}{N}}\right)^0 + \left(e^{-\frac{m}{N}}\right)^1 + \ldots\right) \geq N\frac{1}{1-e^{-\frac{m}{N}}} = \frac{N}{1-e^{-\frac{m}{N}}},$$

$$0 < \frac{m}{N} \leq 1,$$

an expected path resolution verification rate is represented as $K=v/E(X)$, where K represents the expected path resolution verification rate and v represents a sending rate of the data packet of the data flow.

Specifically, the evaluation of the total number of transmitted data packets for parsing verification being performed once on the entire expected path is performed, and the expected path resolution verification rate may be analyzed. When the transmitted X data packets have been embedded with all N VS fragments of the EPVS verification structure at least once using the method at S2, each intermediate network node even the destination can perform the parsing verification at least once after receiving these data packets, thereby achieving once analytical verification for the entire expected path.

For the total number X of transmitted data packets, its expected value can be calculated according to formula (3). As $P(X \geq t)=1-P(X \leq t-1)$ and combined with formula (2), the expected value of the total number X of transmitted data packets is further obtained according to formula (4).

The expected value of the total number X of transmitted data packets is further deduced, and the lower limit range of the expected value is obtained as shown in formula (5).

If the data packet sending rate of a certain data flow is v (packet/second), the parsing verification rate of the entire expected path of data flow transmission is defined as K (times/second), then the parsing verification rate is K=v/E(X). Corresponding to different levels of security requirements, when the data flow packet transmitting rate v is known, by setting different number m of the VS fragments embedded in the data packet, different expected values of the total number of transmitted data packets are generated, and a certain expected path parsing verification rate can be obtained.

It is understandable that after the expected path parsing verification rate K is obtained, the number of different fragment information m embedded in the header of the data packet to be transmitted (that is, between the IP header and the TCP header) by the data flow source may be set according to the expected path parsing verification rate K (that is, the corresponding security requirement level). Through the above introduction, the method of the embodiment of the present disclosure proposes an authenticity verification technology for fast source and path embedded with random authentication. Based on the expected source and path information, it focuses on whether the routing forwarding strategy is actually executed. The respective routing nodes perform verification on the received data packets in real time to determine whether there is any abnormality in the current data packet forwarding state. If there is any abnormality, the abnormal data packet is discarded in time, and an abnormal error report of the data flow is generated to prevent malicious consumption of subsequent routing nodes calculating storage resources, thereby alleviating the malicious attacks that may be caused to the destination, and providing information support for the discovery of potential malicious nodes and positioning error forwarding behavior.

In particular, in the software-defined network architecture, the communication between the control plane and the forwarding plane can be used to more effectively realize the notification of the authenticity verification information and abnormal error information report, and further improve the reliability and efficiency of the transmission of state information related to authenticity verification technology. Compared with related arts, the embodiments of the present disclosure not only effectively reduces the additional communication overhead introduced by the verification structure in the data packet by optimizing the process steps of the design source and path verification, but also minimizes the processing overhead of the verification structure by each routing node, which ensures the simplicity, efficiency and feasibility of the verification process in data transmission, and to further lay the foundation for ensuring the credibility and security of the high-speed core network.

Figure 2:
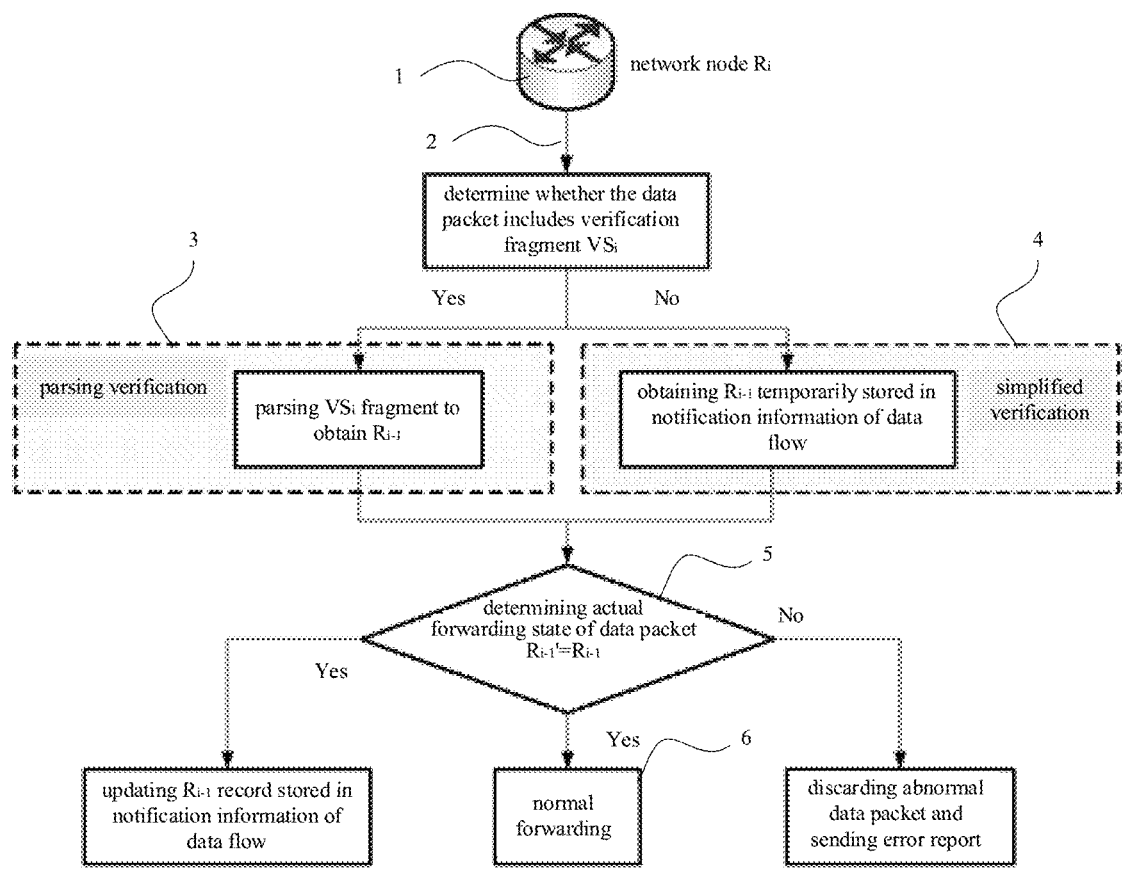
FIG. 2 is a flowchart of a verification method for fast source and path embedded with random authentication according to an embodiment of the present disclosure.

The method will be described in detail according to the flowchart and specific embodiments shown in FIG. 2.

Assume that the expected transmission path corresponding to the predetermined path strategy of a certain data flow is 10 hops, that is, from the source node $R_0$ through the intermediate routing nodes $R_1$ to $R_9$ to the destination $R_{10}$.

1) The data flow source $R_0$ generates the corresponding expected path EPVS verification structure according to the predetermined path strategy. The complete EPVS verification structure may be represented by $\{VS_1, VS_2, VS_3 \ldots VS_{10}\}$, namely $\{<R_0>, <R_1>, <R_2> \ldots <R_9R_0>\}$. At the same time, the source $R_0$ pushes the notification information of the current data flow to each routing node on the expected path, including $R_1$ to $R_9$ to the destination $R_{10}$, to remind each network node to store the expected previous hop information value in the notification information, and the valid time limit of the data flow and other contents for the subsequent verification of the data flow.

2) The data flow source $R_0$ randomly embeds one of the 10 VS fragments of the EPVS verification structure into the header of the data packet to be transmitted (that is, between the IP header and the TCP header) with the same probability P, and transmits the data packet carrying the VS fragment to the next hop routing node. Specifically, the probability of embedding a certain $VS_i$ fragment into a certain data packet is $P=C_9^0/C_{10}^1=1/10$.

3) After each intermediate routing node receives the data packet of the data flow, if the corresponding VS fragment is embedded in the header of the current data packet, the parsing verification operation may be performed. For example, the header of the data packet received by the routing node $R_5$ carries $VS_5$ fragment information, then the node $R_5$ uses its own verification symmetric key to parse the fragment $VS_5$ to obtain the expected previous hop of information $R_4$, and compare $R_4$ with the actual forwarding state of the current data packet. That is, it is determined whether the previous hop of information (indicated by $R_{4'}$) of the actual receiving port of the data packet is consistent with $R_4$. If they are consistent, it means that the data packet has passed the previous hop of node of the expected path, the current forwarding state of the data packet is verified, and the routing node will continue to forward the data packet. At the same time, the routing node $R_5$ updates and replaces the expected previous hop of information value temporarily stored in the notification information of the data flow by the expected previous hop of information $R_4$ obtained after the parsing.

If they are inconsistent, the routing node $R_5$ finds that the verification fails, the data packet is discarded to prevent security hazards caused by the abnormal data packet continuing to reach the receiving end, and the node $R_5$ needs to issue error report information to the data flow source $R_0$ and destination $R_{10}$ according to the actual situation. When the level of security requirements is relative high, the respective routing nodes will also actively generate warning report information for the received data packet of the data flow with a random time interval within the valid time limit of the data flow (that is, the warning report information describes that the data packet of the data flow is received with a certain time interval and whether its verification state is normal and other key contents), and the warning report information may be respectively delivered to the corresponding data flow source $R_0$ and destination $R_{10}$.

4) If the header of the data packet received by the intermediate routing node is not embedded with the corresponding VS fragment, the simplified verification operation is performed. For example, if the header of the data packet received by the routing node $R_6$ does not carry $VS_6$ fragment information, then the node $R_6$ uses the latest expected previous hop of information value $R_5$ stored in the notification information of the data flow to determine whether the previous hop of information (represented by $R_{5'}$) of the actual receiving port of the data packet is consistent with $R_5$. If they are consistent, the verification of the current forwarding state of the data packet is passed, and the routing node $R_6$ will continue to forward the data packet. Otherwise, if the routing node $R_6$ finds that the verification fails, the data packet is discarded and the corresponding error report information or warning report information may be issued to the data flow source $R_0$ and destination $R_{10}$ according to the actual situation.

5) After the destination $R_{10}$ receives the data packet of the data flow, the previous hop of information of the actual receiving port of the current data packet $R_{9'}$ is compared with the expected previous hop of information $R_9$ after parsing (or, in the notification information) according to whether the current data packet is embedded with the VS fragment corresponding to the current data packet by using the parsing verification or simplified verification, to determine whether $R_{9'}$ is consistent with $R_9$, and it may be determined whether the transmitting source address information of the current packet header is the consistent as the information on the expected starting node $R_0$ obtained by the parsing (or in the notification information). If all the above verifications are passed, it means that the verification of the data packet on the whole transmission path of the data flow data packet has been completed, and the received data packet is in a normal state. Otherwise, if the receiving end finds that the verification fails, the data packet is discarded to prevent the abnormal data packet from causing greater security hazards.

Figure 3:
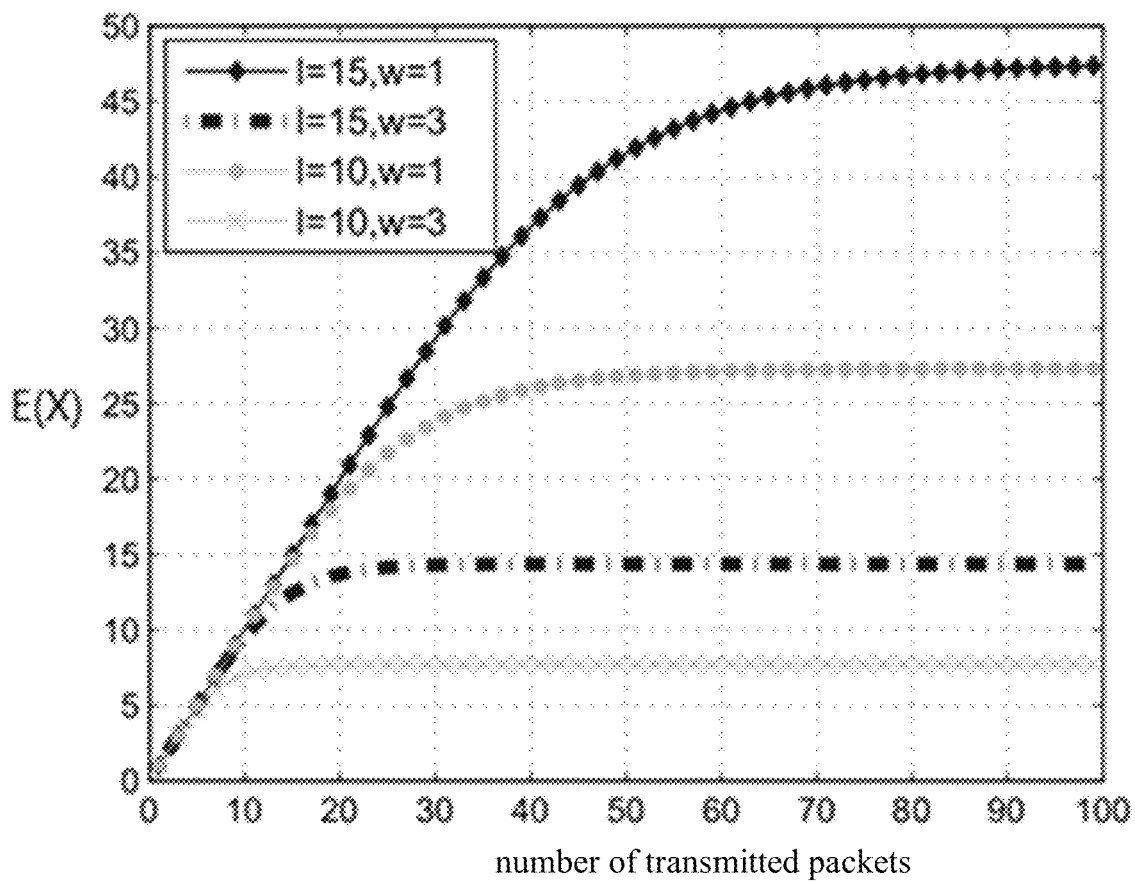
FIG. 3 shows diagram showing expected value changes under different expected path lengths and numbers of embedded fragments according to an embodiment of the present disclosure.

6) The parsing verification evaluation is performed on the entire expected path. Under the conditions of different expected path lengths and different embedded numbers of data packets VS fragments, the expected value $E(X)$ of the total number of transmitted data packets can be obtained as shown in FIG. 3 according to formulas (4) and (5). When the length of the expected path is 10 hops, the corresponding EPVS verification structure contains 10 VS fragments, each time one VS fragment is embedded in the data packet, the expected value $E(X)$ is about 27 data packets, and under the condition that 3 different VS fragments are embedded in the data packet each time, the expected value $E(X)$ is about 7 data packets.

If the data packet transmitting rate of a data flow is 74.9 k (packets/second), and the expected path length of the data flow is 15 hops, the corresponding EPVS verification structure contains 15 VS fragments, even if one VS fragment is embedded in the data packet each time, the expected value $E(X)$ is about 47 data packets, then the parsing verification rate K of the entire expected path of the data flow transmission is about 1595 (times/second), which is sufficient to meet the security requirements of most application scenarios.

With the method provided by the embodiment of the present disclosure, fragmented authentication is performed on the expected source and path information, authentication fragments may be randomly embedded in the header of the data packet according to the required security level at the source, and the respective routing nodes and the destination perform the authenticity verification of the forwarding state on the received data packet according to the authentication information in real time. The entire verification process can effectively control and reduce the additional communication overhead caused by the verification structure according to the requirements of the security level, and at the same time, each routing node does not need to change the verification structure of the packet header (that is, without adding any marks) to minimize the complex calculations required for verification as far as possible, to make extra cost of each routing node to complete the abnormality verification and simpler, faster and more efficient verification steps, ensuring the lightweight and feasibility of the authenticity verification of data transmission in the network system. In addition, the respective routing nodes can timely transmit reports on abnormal conditions to further help discovering potential malicious nodes and locate incorrect forwarding behaviors. In particular, in the software-defined network architecture, the control node can provide authentication fragment generation services for different data flows and submits the same to the transmitting source to complete the distribution of different data flow notification information, further reducing the state information interaction between the transmitting source and the respective forwarding nodes. At the same time, the control node can efficiently collect the abnormal error report of each forwarding node, and provide information support for the credibility and security of the core network more quickly.

In addition, the terms "first" and "second" are only used for descriptive purposes, and cannot be understood as indicating or implying relative importance or implicitly indicating the number of indicated technical features. Therefore, the features defined with "first" and "second" may explicitly or implicitly include at least one of the features. In the description of the present disclosure, "plurality" means at least two, such as two, three, etc., unless otherwise specifically defined.

In the description of this specification, descriptions with reference to the terms "one embodiment", "some embodiments", "examples", "specific examples", or "some examples" etc. mean specific features described in conjunction with the embodiment or example, structure, materials or features are included in at least one embodiment or example of the present disclosure. In this specification, the schematic representations of the above terms do not necessarily refer to the same embodiment or example. Moreover, the described specific features, structures, materials or characteristics can be combined in any one or more embodiments or examples in a suitable manner. In addition, those skilled in the art can combine and combine the different embodiments or examples and the features of the different embodiments or examples described in this specification without contradicting each other.

Although the embodiments of the present disclosure have been shown and described above, it can be understood that the above-mentioned embodiments are exemplary and should not be construed as limiting the present disclosure. Those of ordinary skill in the art can comment on the above-mentioned embodiments within the scope of the present disclosure. The embodiment undergoes changes, modifications, substitutions, and modifications.

What is claimed is:

1. A verification method for fast source and path embedded with random authentication, comprising:
   generating, by a data flow source, a corresponding verification structure for an expected path according to a predetermined path strategy, and transmitting notification information of a current data flow to respective routing nodes on the expected path, wherein, the verification structure for the expected path comprises N pieces of fragment information to be verified, and N is the number of hops of the expected path;
   embedding, by the data flow source, different m pieces of fragment information randomly selected with same possibility from the verification structure for the expected path to a header of a data packet to be transmitted in a data flow, and transmitting the data packet to be transmitted with the embedded fragment information to a next routing node of the expected path, wherein 1≤m≤N;

receiving a data packet by each intermediate routing node on the expected path, performing a parsing verification on the data packet in case that the fragment information corresponding to the routing node is embedded in the received data packet, and forwarding the data packet to the next routing node in case that the parsing verification passes;

performing a simplified verification according to the notification information in case that no fragment information corresponding to the routing node is embedded in the received data packet, and forwarding the data packet to the next routing node in case that the simplified verification passes;

verifying, by a data flow destination, the received data packet through the parsing verification or the simplified verification after receiving the data packet, determining that the received data packet completes a verification process on the expected path and is normal in case that the verification passes, and discarding the received data packet in case that the verification fails; and performing a parsing verification evaluation on the expected path, and setting different parsing verification rates for the expected path according to different security level requirements, so as to achieve different levels of source and path verification strength, wherein performing the parsing verification evaluation on the expected path comprises:

performing, by intermediate routing nodes and the data flow destination, the parsing verification on all data packets received for at least once in case that X data packets of the data flow have embedded with the N pieces of fragment information of the expected path verification structure at least once, to achieve once parsing verification of the expected path;

wherein, a probability that the data flow source embeds a piece of fragment information into a data packet is: $P = C_{N-1}^{m-1}/C_N^m = m/N$, where C represents a combinations formula, the data flow source has transmitted t data packets, and a probability $q_{t,i}$ that the data flow source has embedded an i-th piece of fragment information into the data packet at this time is represented as:

$$q_{t,i} = 1 - (1-p)^t = 1 - \left(1 - \frac{m}{N}\right)^t, \quad (1)$$

$$1 \le i \le N,$$

for the N pieces of fragment information of the expected path verification structure, in case that the data flow source embeds all the N pieces of fragment information in the X data packets that have been transmitted for at least once, a probability that the number of the transmitted data packets X is less than or equal to t (X≤t) is represented as:

$$P(X \le t) = \prod_{i=1}^{N} q_{t,i} = (q_{t,i})^N = \left(1 - \left(1 - \frac{m}{N}\right)^t\right)^N, \quad (2)$$

for the total number of the transmitted data packets X, an expected value is represented as:

$$E(X) = \sum_{t=1}^{\infty} t P(X = t) = \sum_{t=1}^{\infty} P(X = t) \sum_{r=1}^{t} 1 = \quad (3)$$

$$\sum_{r=1}^{\infty} \sum_{t=r}^{\infty} P(X = t) = \sum_{r=1}^{\infty} P(X \ge r) = \sum_{t=1}^{\infty} P(X \ge t),$$

based on P(X≥t)=1−P(X≤t−1) and the formula (2), an expected value of the total number of the transmitted data packets X is represented as:

$$E(X) = \sum_{t=1}^{\infty}(1 - P(X \le t-1)) = \sum_{t=1}^{\infty}\left(1 - \left(1 - \left(1 - \frac{m}{N}\right)^{t-1}\right)^N\right), \quad (4)$$

a lower limit range of the expected value is represented as follows by deriving the formula (4):

$$E(X) = \sum_{t=1}^{\infty}\left(1 - \left(1 - \left(1 - \frac{m}{N}\right)^{t-1}\right)^N\right) > \sum_{t=1}^{\infty}\left(1 - \left(1 - e^{-\frac{m}{N}(t-1)}\right)^N\right) \ge \quad (5)$$

$$\sum_{t=1}^{\infty}\left(1 - \left(1 - N e^{-\frac{m}{N}(t-1)}\right)\right) = \sum_{t=1}^{\infty} N e^{-\frac{m}{N}(t-1)} \ge N \sum_{t=1}^{\infty} e^{-\frac{m}{N}(t-1)} =$$

$$N\left(\left(e^{-\frac{m}{N}}\right)^0 + \left(e^{-\frac{m}{N}}\right)^1 + \ldots\right) \ge N \frac{1}{1 - e^{-\frac{m}{N}}} = \frac{N}{1 - e^{-\frac{m}{N}}},$$

$$0 < \frac{m}{N} \le 1,$$

an expected path resolution verification rate is represented as K=v/E(X), where K represents the expected path resolution verification rate and v represents a sending rate of the data packet of the data flow.

2. The method of claim 1, wherein notification information received by different routing nodes on the expected path are different, the notification information comprises an expected previous hop of information of each routing node and a valid time limit of the data flow, each routing node needs to parse the notification information with a verification symmetric key for different data flows, and each routing node temporarily stores and maintains the received notification information according to the valid time limit of the data flow.

3. The method of claim 1, comprising: encrypting and generating, by the data flow source, the fragment information of the expected path verification structure according to verification symmetric keys for different data flows of the respective routing nodes on the expected path.

4. The method of claim 3, comprising: generating the last piece of fragment information $VS_{Last}$ by encrypting an expected previous hop of information of the data flow destination $R_{Last}$ and information of the data flow source $R_0$ according to a verification symmetric key of the data flow destination; and generating fragment information $VS_i$ except for the last piece of fragment information $VS_{Last}$ by encrypting an expected previous hop of information of a routing node $R_i$ according to a verification symmetric key of the routing node $R_i$.

5. The method of claim 1, wherein performing the parsing verification on the data packet in case that the fragment information corresponding to the routing node is embedded in the received data packet comprises:
performing, by an intermediate routing node on the expected path, the parsing verification on the corresponding fragment information with a verification symmetric key of the intermediate routing node, to obtain an expected previous hop of information of the current data packet, and determining whether an actual previous hop of information of a receiving port of a current data packet is consistent with the expected previous hop of information, determining that the verification passes and replacing the expected previous hop of information which is temporarily stored in the notification information by the expected previous hop of information which is obtained after parsing in case that the actual previous hop of information is consistent with the expected previous hop of information, and determining that the verification fails in case that the actual previous hop of information is inconsistent with the expected previous hop of information.

6. The method of claim 5, comprising:
performing, by each intermediate routing node on the expected path, a verification on the received data packet, discarding the received data packet in a case that the verification fails and transmitting at least one of error report information and warning report information to the data flow source and the data flow destination respectively based on a security level.

7. The method of claim 6, comprising:
actively generating, by the respective routing node, warning report information for the received data packet with a random time interval in a valid time limit of the data flow in case that a security requirement level is higher than a preset value, and transmitting the warning report information to the data flow source and the data flow destination respectively, wherein the warning report information comprises at least the data packet of the data flow received within a preset time interval, and information on whether the verification for the data packet passes.

8. The method of claim 5, wherein verifying, by the data flow destination, the received data packet through the parsing verification or the simplified verification after receiving the data packet comprises:
comparing an expected previous hop of information of the current data packet with the actual previous hop of information of the receiving port of the current data packet, and comparing actual transmitting source address information in the header of the current data packet with expected start node information in case that the expected previous hop of information of the current data packet is consistent with the actual previous hop of information of the receiving port of the current data packet, and determining that the verification passes in case that the actual transmitting source address information in the header of the current data packet is consistent with expected start node information, and determining that the verification fails and discarding the data packet in case that the actual transmitting source address information in the header of the current data packet is inconsistent with expected start node information.

9. The method of claim 1, wherein performing the simplified verification according to the notification information in case that no fragment information corresponding to the routing node is embedded in the received data packet comprises:
comparing, by an intermediate routing node on the expected path, an expected previous hop of information in the notification information with an actual previous hop of information of a receiving port of a current data packet to determine whether they are consistent, and determining that the verification passes in case that the expected previous hop of information in the notification information is consistent with the actual previous hop of information of the receiving port of the current data packet, and determining that the verification fails in case that the expected previous hop of information in the notification information is inconsistent with the actual previous hop of information of the receiving port of the current data packet.

10. The method of claim 9, comprising:
performing, by each intermediate routing node on the expected path, a verification on the received data packet, discarding the received data packet in a case that the verification fails and transmitting at least one of error report information and warning report information to the data flow source and the data flow destination respectively based on a security level.

11. The method of claim 10, comprising:
actively generating, by the respective routing node, warning report information for the received data packet with a random time interval in a valid time limit of the data flow in case that a security requirement level is higher than a preset value, and transmitting the warning report information to the data flow source and the data flow destination respectively, wherein the warning report information comprises at least the data packet of the data flow received within a preset time interval, and information on whether the verification for the data packet passes.

12. The method of claim 9, wherein verifying, by the data flow destination, the received data packet through the parsing verification or the simplified verification after receiving the data packet comprises:
comparing an expected previous hop of information of the current data packet with the actual previous hop of information of the receiving port of the current data packet, and comparing actual transmitting source address information in the header of the current data packet with expected start node information in case that the expected previous hop of information of the current data packet is consistent with the actual previous hop of information of the receiving port of the current data packet, and determining that the verification passes in case that the actual transmitting source address information in the header of the current data packet is consistent with expected start node information, and determining that the verification fails and discarding the data packet in case that the actual transmitting source address information in the header of the current data packet is inconsistent with expected start node information.

* * * * *